United States Patent Office.

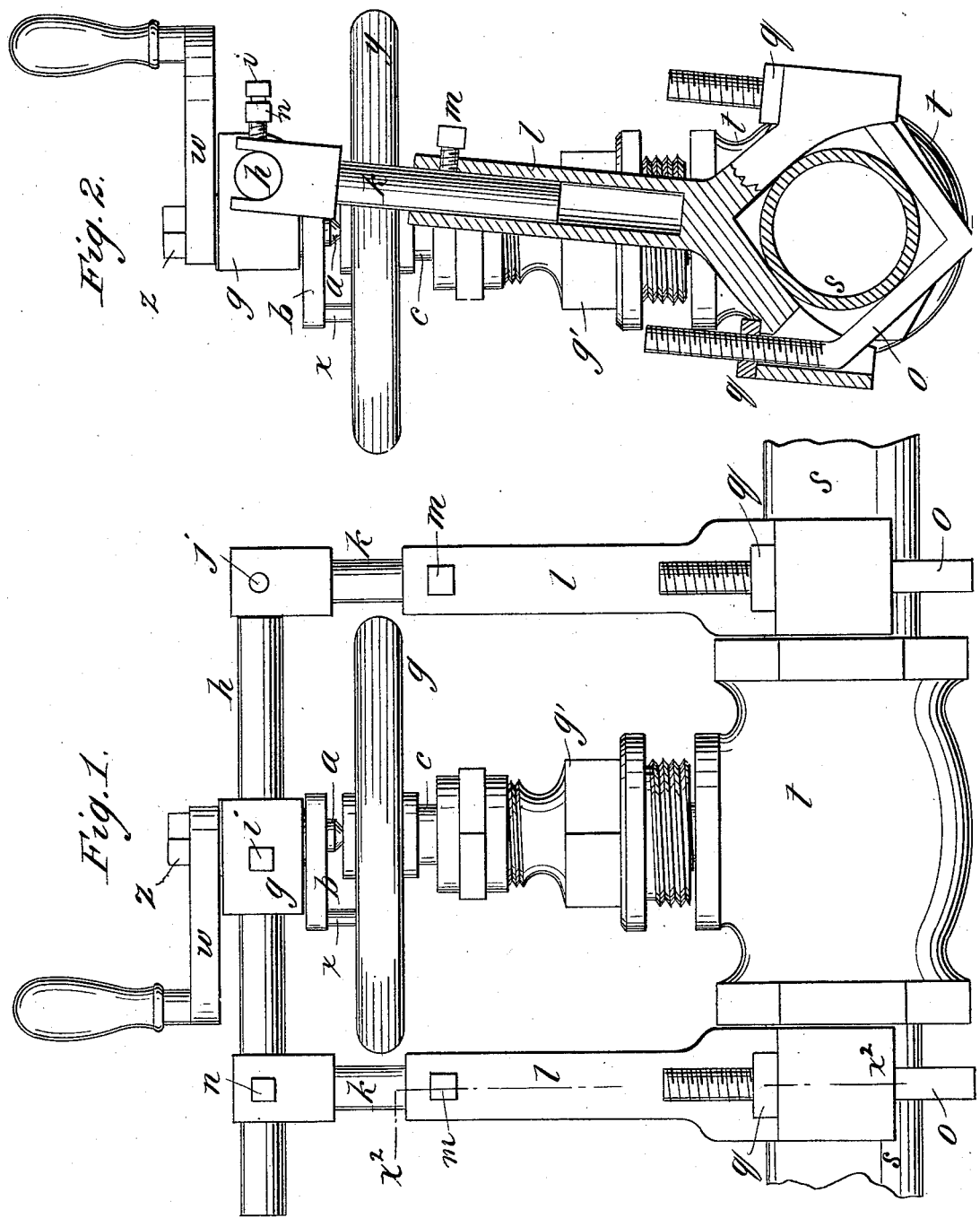

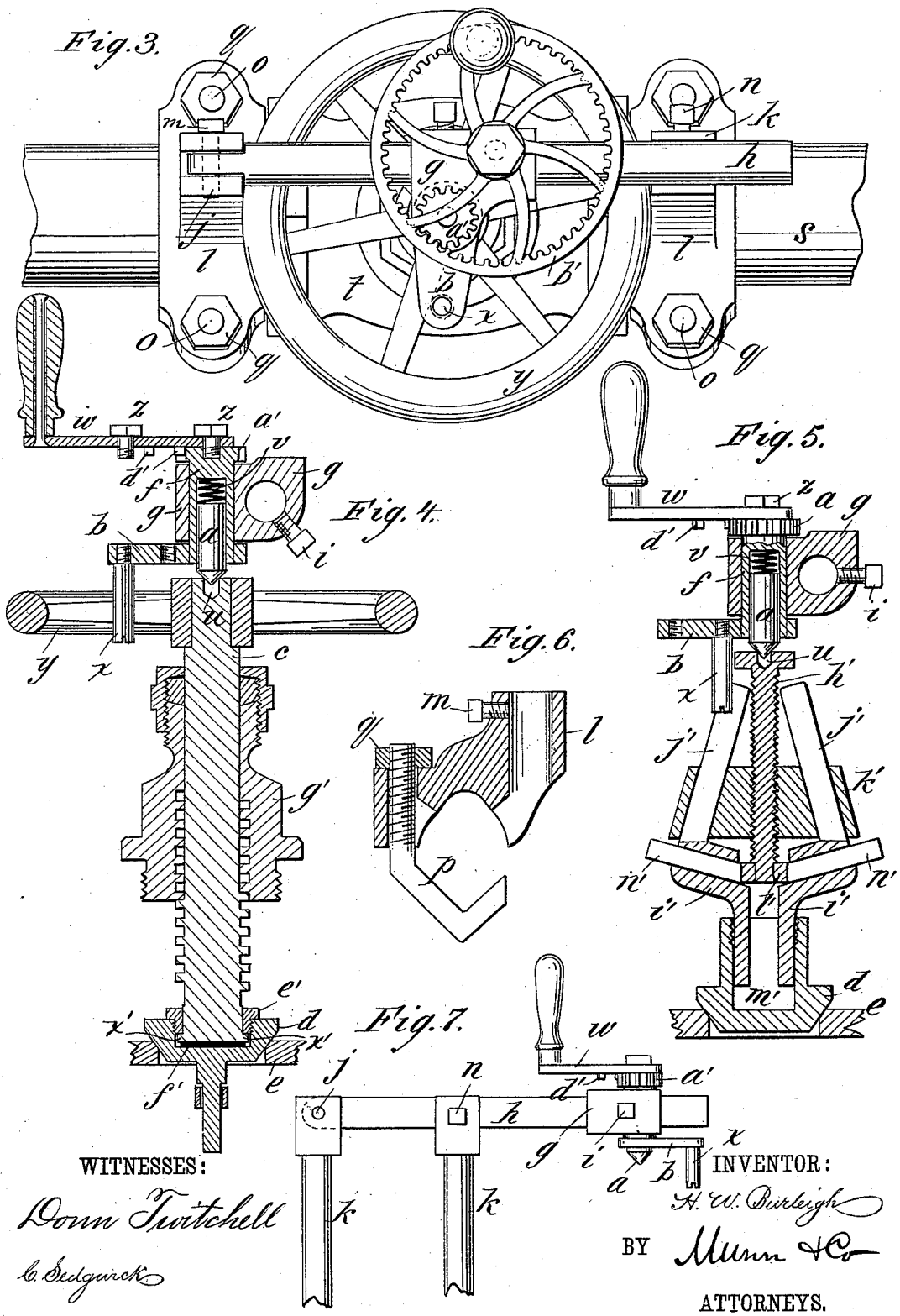

HARRY W. BURLEIGH, OF FRANKLIN, NEW HAMPSHIRE.

VALVE-GRINDER.

SPECIFICATION forming part of Letters Patent No. 297,063, dated April 15, 1884.

Application filed December 11, 1883. (No model.)

*To all whom it may concern:*

Be it known that I, HARRY W. BURLEIGH, of Franklin, in the county of Merrimac and State of New Hampshire, have invented a new and Improved Valve-Grinder, of which the following is a full, clear, and exact description.

My invention consists of improved clamps, centering devices, revolving gear, and coupling mechanism, whereby it is designed to provide simple and efficient means for readily grinding globe and similar styles of valves and check-valves and refitting them without disconnecting them from the pipes with which they are in use, and thus save considerable expense of time and labor of disconnecting the pipes to take out the valves and connecting them again to replace the valves, all as hereinafter fully described.

Reference is to be had to the accompanying drawings, forming part of this specification, in which similar letters of reference indicate corresponding parts in all the figures.

Figure 1 is a side elevation of my improved valve-grinding apparatus applied to a globe-valve for grinding it without removing it from the pipe. Fig. 2 is a section of Fig. 1 on the line $x^2 x^2$. Fig. 3 is a plan view with speed driving-gear applied. Fig. 4 is a sectional elevation of the centering and revolving apparatus, also of a valve-stem and valve, showing the application of the said apparatus to the valve. Fig. 5 is a sectional elevation of a coupling for connecting the centering and revolving apparatus to a check-valve. Fig. 6 is a sectional elevation of a modified form of clamp for coupling the grinding apparatus to the pipe containing the valve; and Fig. 7 is a side elevation of a modified adjustment of the apparatus, showing the adaptation of it to angle-valves and to places where it is inconvenient to attach the clamp both sides of the valve.

For holding a center, $a$, and a driving crank or arm, $b$, to retain the valve-stem $c$ in its true position with reference to the valve-seat $d$, and to rotate the valve for grinding it to the seat, I mount a center-holding hollow shaft, $f$, in a cast or forged block, $g$, fitted to a shaft, $h$, so as to be turned on and shifted along the shaft at will to adjust it, and having a set-screw, $i$, to secure it in any position. The shaft $h$ is pivoted at $j$ to the head of a rod, $k$, capable of turning and sliding in a clamp-stand, $l$, and being fastened in said stand by a set-screw, $m$. The shaft $h$ is also secured near its other end by a set-screw, $n$, in the head of another rod, $k$, similarly fitted in another clamp-stand, $l$. The clamp-stands are secured by the yokes $o$ or hooks $p$ and nuts $q$ to the pipes $s$ on both sides of the valve-case $t$, or on one side when it may be preferred, as indicated in Fig. 7, to hold the supporting-shaft $h$ in position. The center-holding shaft is with this holding device adjusted over the center-socket $u$ in the top of the stem $c$ and in line with the stem, so that the valve will be properly pressed on the seat by a spring, $v$, in the socket of the shaft above the center $a$, and the valve will be rotated by a crank, $w$, attached to the upper end of the center-shaft $f$, and the arm $b$, attached to the lower end, and having a pin, $x$, engaging the hand-wheel $y$ of the valve-stem. The crank $w$ may be attached to the top of the center-shaft by a screw, $z$, at one end of the crank, or near the middle, as preferred, and when greater speed is required the center-shaft may gear by a pinion, $a'$, with a driving-wheel, $b'$, suitably journaled on the top of the block $g$, the crank $w$ being fastened on the driving-wheel $b'$, as in Fig. 3. The crank $w$ has studs $d'$, suitably arranged with relation to the holes for the screws $z$ to engage with a couple of the teeth of the pinion $a'$ for substantially connecting the crank to the shaft. When the valve $d$ is not so connected to the stem $c$ that it will be turned by the stem, it must be disconnected by turning out the bush $e'$ and placing a washer, $f'$, of flexible material between the end of the stem and the bottom of the socket of the bush, the washer being to make the proper adhesion or friction for causing the rotation of the valve; or the valve may be connected in any other approved way. The bush bears against a collar, $x'$, of the valve-stem to hold the valve to it. The collar may be bolted on the stem.

When the clamp-stands $l$ have been properly adjusted and clamped fast to the pipe, using the center-socket $u$ of the valve-stem as a guide, the set-screw $n$ is loosened, and the shaft $h$, with the centering and revolving gear, swung out of the way to allow the valve-support $g'$ to be detached and the valve to be taken out for applying the emery or other material to be used in the grinding. The valve is then replaced, with the support $g'$ temporarily secured above the case, and the shaft is readjusted and secured by the set-screw $n$, which returns the center $a$ to the exact position it occupied before, where it holds the valve-stem without the aid of the support $g'$ while being ground.

It will be seen that the valve may be readily taken out as frequently as may be required for applying the grinding material.

When it is required to grind an angle-valve or to grind any valve where the pipe is accessible only at one side of the valve for attaching the clamps, they may be applied, as shown in Fig. 7, with the centering and turning devices mounted near the free end of the shaft $h$, and one of the holding-rods $k$, having the set-screw $n$ between these devices and the other holding-rod to which said shaft is pivoted.

When a check-valve is to be ground which only has a short stem, Fig. 5, I use a screw-stem, $h'$, having the center-socket $u$ for the center $a$, and also having a clamp consisting of jaws $i'$, having upwardly and inwardly inclined arms $j'$, conical nut $k'$, and the pronged guide-collar $l'$, in which the lower end of stem $h'$ is swiveled, and by which the jaws $i'$ may be either set in the socket $m'$ of the valve-stem or outside of it, and be made to clamp the same according as the nut is screwed up or down to contract or expand the jaws, the arms of which converge on the center-stem $h'$, and are fitted in correspondingly converging holes through the nut $k'$, by which they are made to open or close, and the jaws are fitted on the radial guide-prongs $n'$ by means of inclined holes in which they move at right angles to the inclination of the arms $j'$.

The arm $b$ is provided with a number of holes for connecting the pin $x$ suitably for the wheels $y$ of the large or small valves.

Having thus described my invention, I claim as new and desire to secure by Letters Patent—

1. The improved holding device for valve-grinding mechanism, consisting of clamp-stands $l$, having means for being clamped to the pipe, the rods $k$, fixed adjustably in said clamp-stands, and the shaft $h$, pivoted to one of the said clamp-stands and detachably secured to the other, substantially as described.

2. The combination of the adjustable block $g$, having the center-shaft $f$, and center $a$, with supporting-shaft $h$, adjustable rods $k$, and the clamp-stands $l$, said center-shaft $f$ having the driving-arm $b$ and a crank, $w$, or other means for driving it, substantially as described.

3. The crank $w$, having one or more holes for the attaching-screws $z$, and one or more studs $d'$, in combination with the center-shaft $f$, having the pinion $a'$, substantially as described.

4. The clamp-stands $l$, having sockets and binding-screws for the rods $k$, and adjustable clamping mechanism for the lower ends of said rods $k$, for connecting with the pipe $s$ and the rods $k$, substantially as described.

5. The flexible washer $f'$, in combination with the valve $d$, bush $e'$, and stem $c$, for connecting the same, substantially as described.

6. The combination of the center-holding block $g$, tubular center-shaft $f$, center $a$, and spring $v$, said shaft $f$ having a driving crank or pinion and a driving-arm, $b$, and pin $x$, substantially as described.

HARRY W. BURLEIGH.

Witnesses:
FRANK PROCTOR,
JOHN C. NEAL.